US012660841B2

(12) United States Patent
Ceccaroli et al.

(10) Patent No.: US 12,660,841 B2
(45) Date of Patent: Jun. 23, 2026

(54) ROASTING APPARATUS

(71) Applicant: SOCIETE DES PRODUITS NESTLE S.A., Vevey (CH)

(72) Inventors: Stefano Ceccaroli, Chavornay (CH); Vincent Martin, Orbe (CH); Manuel Brandle, Schwellbrunn (CH); Christof Niedermann, Munchwiller (CH); Adrian Ricklin, Zurich (CH)

(73) Assignee: Societe des Produits Nestle S.A., Vevey (CH)

( * ) Notice: Subject to any disclaimer, the term of this patent is extended or adjusted under 35 U.S.C. 154(b) by 767 days.

(21) Appl. No.: 18/006,743

(22) PCT Filed: Jul. 27, 2021

(86) PCT No.: PCT/EP2021/070973
§ 371 (c)(1),
(2) Date: Jan. 25, 2023

(87) PCT Pub. No.: WO2022/023324
PCT Pub. Date: Feb. 3, 2022

(65) Prior Publication Data
US 2023/0270152 A1     Aug. 31, 2023

(30) Foreign Application Priority Data
Jul. 28, 2020     (EP) ..................................... 20188069

(51) Int. Cl.
*A23N 12/10*          (2006.01)
*A23N 12/12*          (2006.01)
(52) U.S. Cl.
CPC ........... *A23N 12/10* (2013.01); *A23N 12/125* (2013.01)

(58) Field of Classification Search
CPC ......... A47J 42/52; A47J 31/42; A23N 12/125; A23N 12/08; A23N 12/10; A23F 5/046
(Continued)

(56) References Cited

U.S. PATENT DOCUMENTS

| | | | | |
|---|---|---|---|---|
| 719,717 | A | * | 2/1903 | Arbuckle ............. A23N 12/125 432/118 |
| 2,105,778 | A | * | 1/1938 | Behr ...................... A23N 12/08 241/34 |

(Continued)

FOREIGN PATENT DOCUMENTS

| | | | | |
|---|---|---|---|---|
| JP | S5810465 | Y2 | * | 2/1983 ............. A23N 12/08 |
| JP | 2009508529 | A | | 3/2009 |

(Continued)

OTHER PUBLICATIONS

Russian Office Action for Appl No. 2023101548/10 dated Dec. 19, 2024, 8 pages.
(Continued)

*Primary Examiner* — Jimmy Chou
(74) *Attorney, Agent, or Firm* — K&L Gates LLP

(57) ABSTRACT

An apparatus for roasting coffee beans includes a housing, a roasting chamber presenting a bottom opening and a top opening, a smoke and particles collector configured to collect smoke and particles from the top opening of the roasting chamber. The roasting chamber is removably mounted to the housing, and the bottom opening of the roasting chamber cooperates with a hot air outlet hole of the housing and the top opening of the roasting chamber cooperating with the smoke and particles collector when the roasting chamber is mounted to the housing. The apparatus further includes a chamber locking assembly for locking the roasting chamber to the housing in a removable manner.

4 Claims, 6 Drawing Sheets

(58) Field of Classification Search
USPC ...................................... 99/467; 34/586, 233
See application file for complete search history.

(56) References Cited

U.S. PATENT DOCUMENTS

| | | | | |
|---|---|---|---|---|
| 2,572,678 A * | 10/1951 | Torres | A23N 12/10 | 34/529 |
| 3,673,699 A * | 7/1972 | Buffington | F26B 17/04 | 34/236 |
| 3,756,139 A * | 9/1973 | Wolens | A23L 7/187 | 99/323.5 |
| 4,325,191 A * | 4/1982 | Kumagai | A23N 12/12 | 34/571 |
| 4,484,064 A * | 11/1984 | Murray | A47J 42/52 | 219/400 |
| 4,494,314 A * | 1/1985 | Gell, Jr. | A23N 12/08 | 34/368 |
| 4,512,247 A * | 4/1985 | Friedman | A23L 7/191 | 118/19 |
| 4,602,147 A * | 7/1986 | Gell | A23N 12/08 | 219/509 |
| 4,683,666 A * | 8/1987 | Igusa | A23N 12/10 | 34/67 |
| 4,698,916 A * | 10/1987 | Farber | A23N 12/08 | 34/586 |
| 4,702,158 A * | 10/1987 | Ishihara | A23L 7/187 | 219/400 |
| 4,748,903 A * | 6/1988 | Fereshetian | A23L 7/187 | 99/323.5 |
| 5,163,786 A * | 11/1992 | Christianson | B65G 53/60 | 55/467 |
| 5,193,444 A * | 3/1993 | Bar-Sheshet | A21B 1/26 | 99/450 |
| 5,230,281 A * | 7/1993 | Wireman | F26B 17/107 | 99/286 |
| 5,269,072 A * | 12/1993 | Waligorski | A23N 12/08 | 34/594 |
| 5,359,788 A * | 11/1994 | Gell, Jr. | A23F 5/04 | 34/594 |
| 5,500,237 A * | 3/1996 | Gell, Jr. | A23N 12/083 | 34/594 |
| 5,564,331 A * | 10/1996 | Song | A23N 12/08 | 34/594 |
| 5,749,288 A * | 5/1998 | Skaling | A23N 12/10 | 99/286 |
| 5,890,418 A * | 4/1999 | Song | A23N 12/08 | 34/594 |
| 5,902,623 A * | 5/1999 | Cochran | A23N 12/12 | 426/466 |
| 5,958,494 A * | 9/1999 | Tidland | A23N 12/083 | 426/523 |
| 5,996,480 A * | 12/1999 | Kelley | A23N 12/08 | 99/286 |
| 6,053,093 A * | 4/2000 | Gerhardt | A23N 12/08 | 34/594 |
| 6,112,644 A * | 9/2000 | Song | A23N 12/086 | 34/594 |
| 6,173,506 B1 * | 1/2001 | Kruepke | A23N 12/083 | 34/68 |
| 6,187,353 B1 * | 2/2001 | Wyman | G07F 17/0078 | 426/450 |
| RE37,238 E * | 6/2001 | Song | A23N 12/08 | 34/594 |
| 6,260,479 B1 | 7/2001 | Friedrich et al. | | |
| 6,382,087 B1 * | 5/2002 | Iiyama | A23N 12/10 | 34/594 |
| 6,460,451 B1 * | 10/2002 | Helman | A23L 7/187 | 99/323.5 |
| 6,511,531 B1 * | 1/2003 | Cartellone | A61L 9/122 | 261/DIG. 89 |
| 6,558,726 B2 * | 5/2003 | Erickson | A23N 12/083 | 34/586 |
| 6,770,315 B2 * | 8/2004 | Moon | A23N 12/08 | 34/360 |
| 7,360,481 B2 * | 4/2008 | Moon | A23N 12/125 | 34/594 |
| 8,495,954 B2 * | 7/2013 | Sommacal | A23N 12/083 | 99/476 |
| 10,412,988 B2 * | 9/2019 | Jacobsen | H05B 6/707 | |
| 2004/0074400 A1 * | 4/2004 | Song | A23N 12/10 | 99/483 |
| 2004/0105922 A1 * | 6/2004 | Moon | A23N 12/08 | 426/466 |
| 2005/0072018 A1 * | 4/2005 | Behm | A23N 12/10 | 219/400 |
| 2013/0344207 A1 * | 12/2013 | Ludwig | A23N 12/10 | 426/233 |
| 2016/0016181 A1 * | 1/2016 | Lathrop | A23G 1/06 | 96/61 |
| 2016/0183586 A1 * | 6/2016 | Min | A23N 12/10 | 99/324 |
| 2019/0037906 A1 * | 2/2019 | Chiu | A23F 5/04 | |
| 2019/0133377 A1 * | 5/2019 | McCullough | A23N 12/08 | |
| 2019/0328026 A1 * | 10/2019 | Westra | A23N 12/10 | |
| 2020/0049403 A1 * | 2/2020 | Krutin | F26B 25/002 | |
| 2021/0392939 A1 * | 12/2021 | Dubief | A23N 12/08 | |
| 2022/0142221 A1 * | 5/2022 | Jin | A23F 5/02 | |
| 2022/0304361 A1 * | 9/2022 | Ceccaroli | B01D 46/0032 | |
| 2023/0355033 A1 * | 11/2023 | Corso | A47J 37/0713 | |
| 2024/0065307 A1 * | 2/2024 | Morend | B01D 46/10 | |
| 2024/0268435 A1 * | 8/2024 | Kim | A23N 12/08 | |
| 2025/0221442 A1 * | 7/2025 | Dubief | A23N 12/125 | |

FOREIGN PATENT DOCUMENTS

| | | | | |
|---|---|---|---|---|
| SU | 1479803 A1 | 5/1989 | | |
| WO | WO-0066961 A1 * | 11/2000 | | A23N 12/00 |
| WO | 2020127360 | 6/2020 | | |
| WO | 2020160895 | 8/2020 | | |

OTHER PUBLICATIONS

Japanese Office Action for Appl No. 2023-501219 dated Jun. 3, 2025, 3 pages.

* cited by examiner

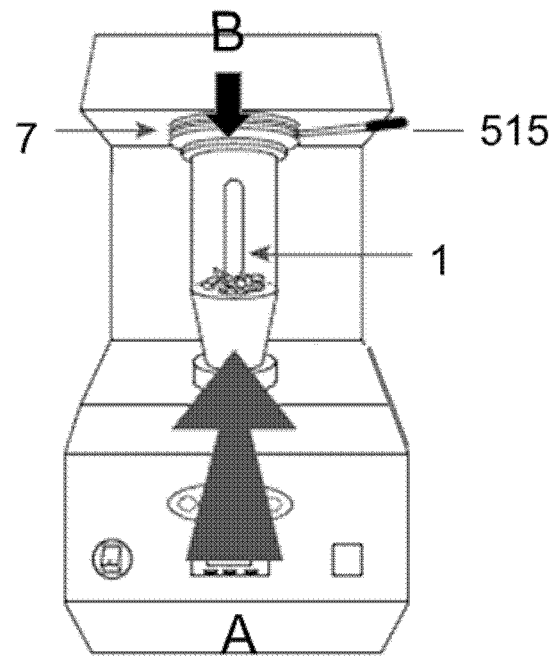
FIGURE 1 – Prior art
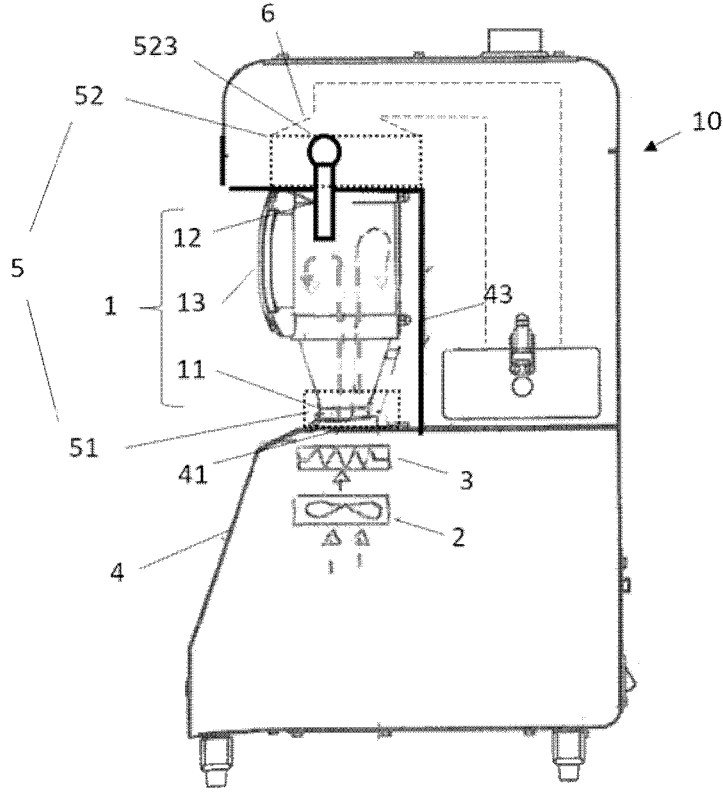
FIGURE 2

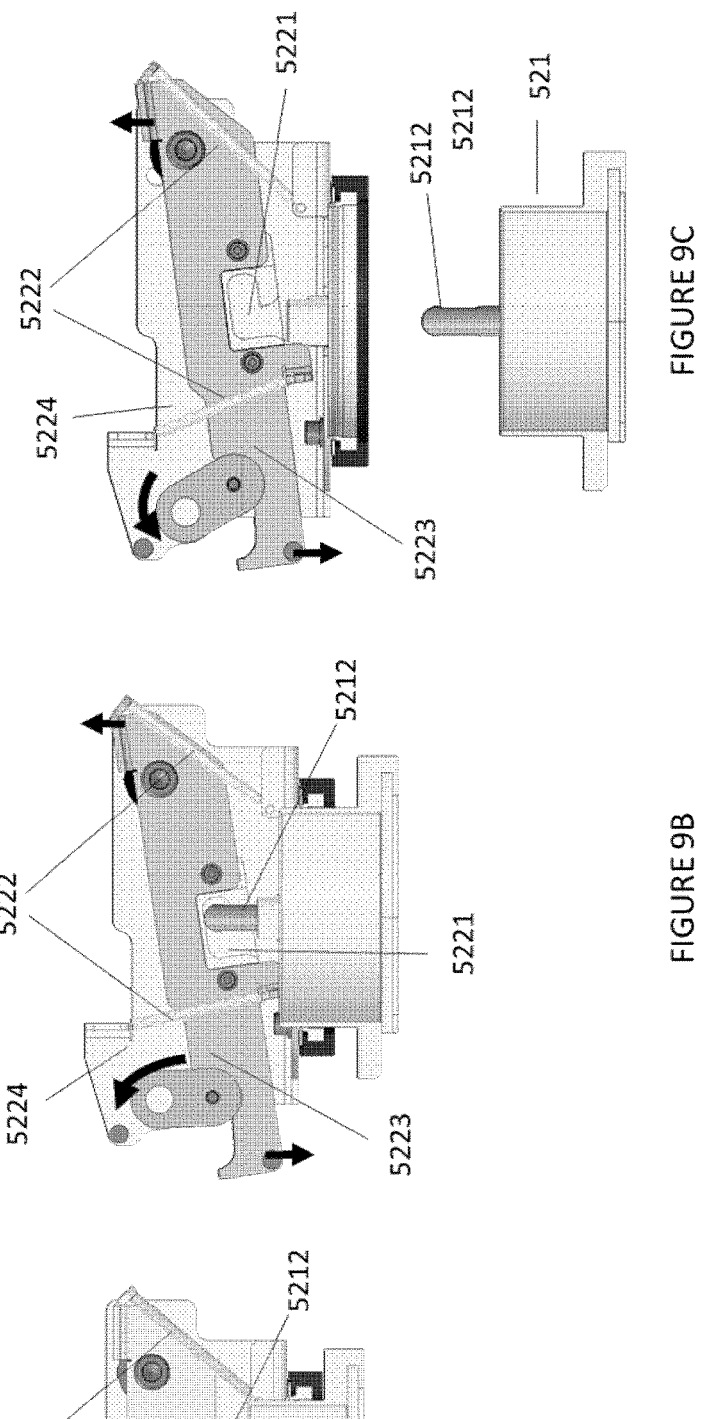
FIGURE 9C
FIGURE 9B
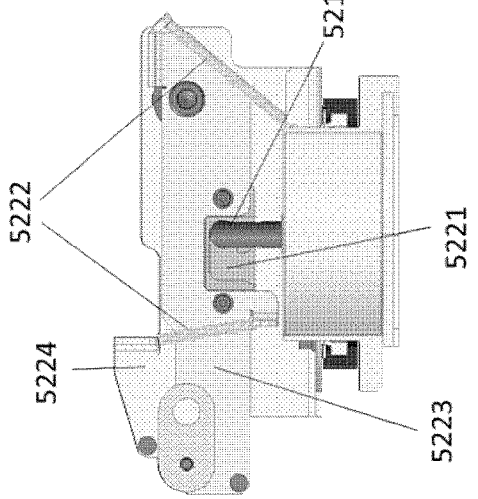
FIGURE 9A

ROASTING APPARATUS

CROSS REFERENCE TO RELATED APPLICATIONS

The present application is a National Stage of International Application No. PCT/EP2021/070973, filed on Jul. 27, 2021, which claims priority to European Patent Application No. 20188069.7, filed on Jul. 28, 2020, the entire contents of which are being incorporated herein by reference.

FIELD OF THE INVENTION

The present invention relates to apparatus for roasting coffee beans with heated air and particularly suited for use in the home or in shops and cafes.

BACKGROUND OF THE INVENTION

Roasting of coffee beans at small scale that is at home or in shops and cafes is usually implemented with small sized apparatuses wherein coffee beans are agitated inside hot air. One type of apparatus uses fluidized bed technology implementing a hot air fluid bed chamber. Within such a chamber, heated air is forced through a screen or a perforated plate under the coffee beans with sufficient force to lift the beans. Heat is transferred to the beans as they tumble and circulate within this fluidized bed.

Most of the roasters implementing fluidized bed technology present the same configuration of the key elements that are the roasting chamber, the heater and the air driver. Quite commonly and obviously, these elements are placed one above the other along a vertical axis, with the air driver positioned at the lowest position, the heater above and the roasting chamber above the heater, hot air being dispensed through the bottom opening of the chamber. In addition, the apparatus usually comprises a smoke collector to collect the dust and smoke produced during roasting and treat them in a further step. This smoke collector is commonly connected to the top of the roasting chamber in a tightly manner.

Preferably, in these roasters, the hot air fluid bed chamber is fully removable from the apparatus in order to introduce and remove the beans and in order to clean the chamber and the roaster.

After these operations and when the chamber is set back inside the apparatus, it is important to tightly connect the bottom and the top of the chamber to the housing of the apparatus for efficient roasting and for obvious security reasons.

Usually, for the bottom connection, the apparatus comprises a hole in the housing of the apparatus to dispense hot air and to which the bottom opening of the chamber is connected as described below.

The upper connection of the chamber can be established by means of an upper chamber locking device in order to tightly fix the chamber to the apparatus. This device usually simply consists in a chamber clamp mechanism working as illustrated in FIG. 1. This clamp mechanism 7 comprises a vertically translatable tube with means to connect with the chamber top opening. When the chamber has to be introduced inside the housing, while holding the handle of the chamber, the operator slides the top flange of the chamber into top horizontal straight rails extending from the bottom of the translatable tube of the clamp mechanism and pushes the chamber back until it is stopped while ensuring that the bottom opening of the chamber fits with the corresponding bottom opening in the housing (as illustrated by arrow A). Then, further to the rotation of the lever 515, the tube is translated downwards to clamp the chamber in the apparatus (as illustrated by arrow B) between the hole at the bottom and the hole at the top and connect simultaneously tightly the bottom and the top. This translation is the result of the rotation of the lever 515 moving down the translatable tube.

This operation of connection of the chamber presents two problems.

First, it has been observed once the operator has introduced the top of the chamber in the clamp mechanism and the chamber is moved down to establish connection, the chamber is not always very well centred and the orientation of the axis of chamber being not always exactly vertical. As a result, when the upper clamp moves the chamber down to finalise the connection of the chamber, the misalignment creates strong pressure in some parts of the bottom outlet and of the bottom opening of the chamber. With time, these parts become in a vertical position is not obtained any longer which impacts the roasting of the beans.

Secondly, in order to enable an easy movement of the clamp mechanism, the clamp mechanism and precisely its screwing parts have to be greased regularly. Yet, on account of the hot temperature of the roasting apparatus, grease smelts and drops which forces the operator to regularly repeat the greasing operation. In addition, dust deposit on the greased parts and cleaning of the clamp mechanism is required frequently. These greasing and cleaning operations are not very convenient because the access to the screwing parts of the clamp mechanism is narrow.

An object of the present invention is to provide a roasting apparatus with an improved locking assembly for the roasting chamber.

SUMMARY OF THE INVENTION

In a first aspect of the invention, there is provided an apparatus for roasting coffee beans comprising:
  a housing,
  a roasting chamber presenting a bottom opening and a top opening,
  an air driver configured to drive air inside the roasting chamber through the bottom opening of said chamber,
  a heater positioned below the bottom opening of the chamber, said heater being configured to heat air driven inside the roasting chamber,
  the air driver and the heater being positioned inside the housing and the housing comprising a hot air outlet hole designed to enable the passage of hot air from the housing inside the bottom opening of the chamber,
  a smoke and particles collector configured to collect smoke and particles from the top opening of the roasting chamber,
  the roasting chamber being removably mounted to the housing, the bottom opening of the roasting chamber cooperating with the hot air outlet hole of the housing and the top opening of the roasting chamber cooperating with the smoke and particles collector when the roasting chamber is mounted to the housing,
  a chamber locking assembly for locking the roasting chamber to the housing in a removable manner, wherein said chamber locking assembly comprises:
  a chamber locking assembly for locking the roasting chamber to the housing in a removable manner, wherein said chamber locking assembly comprises:
    a bottom device for connecting the bottom opening of the chamber to the hot air outlet hole of the housing, said bottom device being configured to receive the bottom opening of the chamber and to hold the chamber, a top fastening device for connecting the top opening of the chamber to the smoke and particles collector, said top fastening device comprising:

a translatable connecting conduit configured to connect the top opening of the chamber to the smoke and particles collector, said connecting conduit being translatable without rotating, a fixed holding device configured to hold the translatable connecting conduit in at least three positions:

one first upper position where the translatable connecting conduit is hold by the fixed holding device and disconnected from the top of the chamber, one second intermediate position where the translatable connecting conduit is connected to the top of the chamber, one lower third position where the translatable connecting conduit is detached from the fixed holding device.

The roasting apparatus comprises a roasting chamber presenting a bottom opening and a top opening. This roasting chamber is designed to enable the production of a fluidized bed of hot air when hot air is introduced through the bottom opening.

Usually, the central and upper part of the chamber is cylindrical.

Generally the bottom opening comprises a grid to hold the beans inside the chamber while enabling the passage of hot air therethrough.

The top opening enables the evacuation of smokes and particles generated during the roasting operation. This top opening also enables the introduction of beans to be roasted and the removal of roasted beans at the end of the roasting operation. For these last operations, the roasting chamber is removable from the housing of the apparatus.

The apparatus comprises an air driver configured to drive air inside the roasting chamber through the bottom opening of said chamber. Usually, this air driver is an air blower or a fan designed to blow air upwardly to the roasting chamber.

The apparatus comprises a heater positioned below the bottom opening of the chamber and configured to heat air before it is introduced inside the roasting chamber. Preferably, this heater is an electrical heater.

The air driver and the electrical heater are positioned inside the housing of the apparatus. The housing comprises a hot air outlet hole designed to enable the passage of hot air generated inside the housing to the bottom opening of the chamber.

As mentioned above, the roasting chamber is removably mounted to the housing. When the roasting chamber is mounted to the housing, the bottom opening of the roasting chamber cooperates with the hot air outlet hole of the housing.

Generally the heater is positioned just below the hot air outlet hole of the housing in order to limit loss of heat during the movement of hot air from the heater to the roasting chamber.

This position of the heater provides a good temperature regulation during the roasting process in the roasting chamber too: actually any temperature change of the heater immediately impacts the temperature inside the roasting chamber.

The apparatus comprises a smoke and particles collector configured to collect smoke and particles produced during the roasting operation. Particles are usually coffee chaffs that can be separated from the smoke within a cyclone device downstream the collector. Smokes can be treated by a further smoke treating unit to remove any air contaminants.

In addition, the apparatus comprises a chamber locking assembly configured to lock the chamber inside the roasting apparatus for a roasting operation in a removable manner, in particular configured to fasten the bottom opening of the chamber to the hot air outlet hole of the housing and to fasten the top opening of the chamber to the the smoke and particles collector housing.

First, this chamber locking assembly comprises a bottom device for connecting the bottom opening of the chamber to the hot air outlet hole of the housing. This bottom device is configured to receive the bottom of the chamber and to hold the chamber on its own. Accordingly, when the chamber is introduced inside the roasting apparatus, the bottom of the chamber is the first to be connected to the housing by means of the bottom device. The operator can put the chamber inside the apparatus and let it here for a moment before finishing the fastening operation.

Preferably, the bottom device is configured to immobilize the chamber in a vertical position inside the roasting apparatus. Consequently, when in a second step the top of the chamber is fastened as described below, there is no risk that the bottom of the chamber moves and becomes worn. In the preferred embodiments, the bottom device can be jaws or a clamp, which hold tightly and firmly the bottom of the chamber.

The jaws can be designed to guide the movement of the operator and let the bottom of the chamber slides to the middle of the jaws when the operator holds and pushes the chamber within the jaws. The jaws are spring loaded in order to firmly hold the bottom of the chamber in their rest positions.

Secondly, this chamber locking assembly comprises a top fastening device for connecting the top opening of the chamber to the smoke and particles collector. This top fastening device comprises at least:

a first part to guide the smoke and particles from the top opening to the collector during the roasting operation, and a second part to hold said first part and to position said first part in three different positions depending on the operation.

This operation can be:

the insertion, or removal, of the chamber inside, or from respectively, the roasting apparatus. The chamber can be removed from the housing for cleaning, filling and emptying coffee beans and then can be fixed to the housing for the roasting operation. or the roasting operation, or the cleaning operation of the top fastening device.

The first part is a translatable connecting conduit configured to connect the top opening of the chamber to the smoke and particles collector. The lower end of this conduit is designed to cooperate with the top of the chamber so that when the conduit and the chamber are moved one to the other, a tight connection can be established.

In one preferred embodiment:

the top of the roasting chamber comprises a flange, and the bottom end of the translatable connecting conduit comprises a guiding rail designed to cooperate with said flange.

Accordingly, when the roasting chamber is introduced inside the roasting apparatus, while the bottom of the chamber is connected to the bottom device of the locking assembly, the flange at the top of the chamber is slid in the guiding rail of the connecting conduit of said same locking assembly.

The translation of the conduit is usually vertical.

The translation does not comprise any rotation of the conduit on itself, such as in a screwing movement. Consequently, this translation guarantees a good alignment of the top opening of the chamber with the connecting conduit and provides a good tightness of said connection during the roasting operation.

The second part of the top fastening device is a fixed holding device. By fixed, it is meant that this holding device remains attached to the housing during the normal operations of the roasting apparatus such as described above (roasting, removal and introduction of the roasting chamber, cleaning operation of the top fastening device). This fixed holding device is configured to hold the translatable connecting conduit in at least three positions.

While remaining attached to the housing, the holding device can hold three different positions.

In the first upper position of the fixed holding device, the translatable connecting conduit is hold by the fixed holding device and disconnected from the top opening of the chamber. In this first position, the chamber can be removed or introduced inside the roasting apparatus.

From this first position, the fixed holding device can move to a second intermediate position where the connecting conduit hold by the fixed holding device is translated downwards without rotating until it is connected to the top opening of the chamber. In this second position, the chamber is tightly connected to the conduit and roasting can be operated since the conduit connects tightly the top opening of the chamber to the dust and smoke collector.

In the third lower position of the fixed holding device, the fixed holding device does not hold the translatable connecting conduit any longer. The conduit is separated from the fixed holding device and from the apparatus and can be cleaned. Here the operator is able to clean and maintain easily these two disassembled parts of the top fastening device.

Preferably the top fastening device comprises a manoeuvring device, such as a lever, to actuate the movement of the top fastening device, in particular the movement of the fixed holding device in its three positions. This device facilitates the movement of the operator.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIG. 1 is a schematic view of a roasting apparatus according to the state of the art and commented in above paragraph "Background of the invention", FIG. 2 illustrates a side view of a roasting apparatus according to the invention with the roasting chamber mounted to the apparatus,

6

Figures 3, 4:
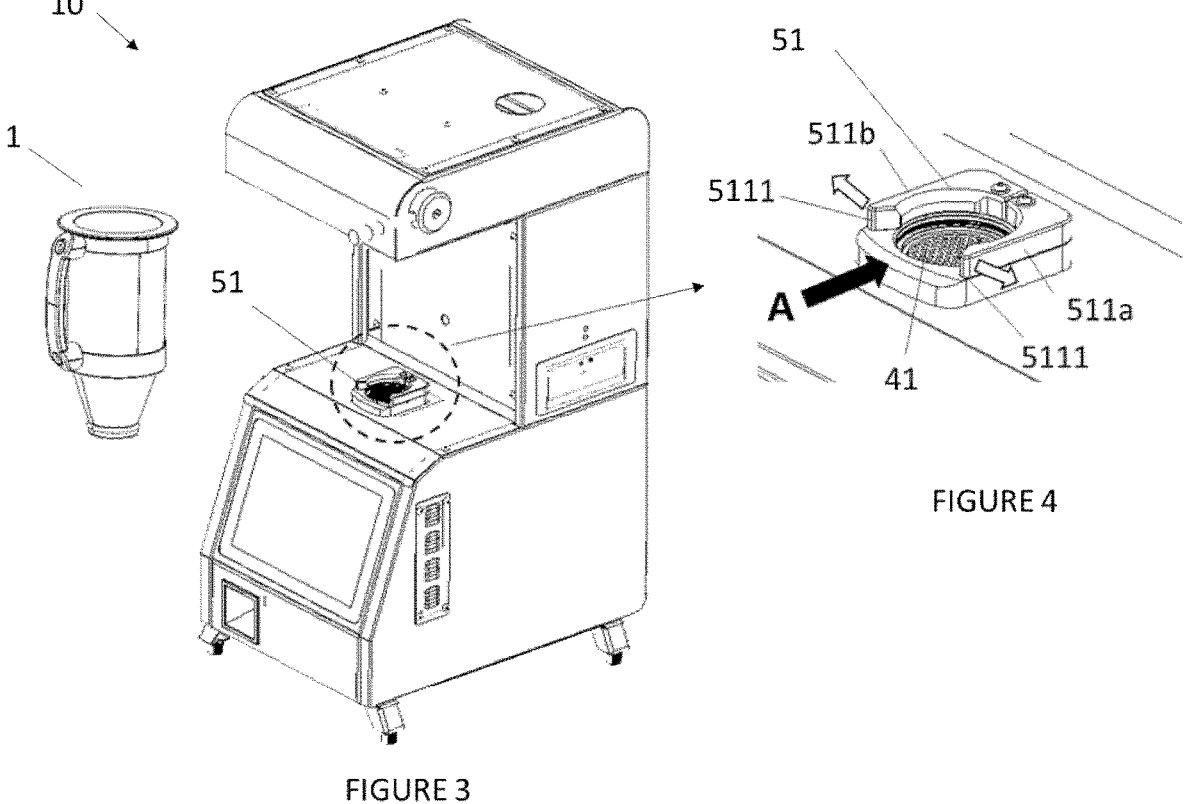
Figure 5A:
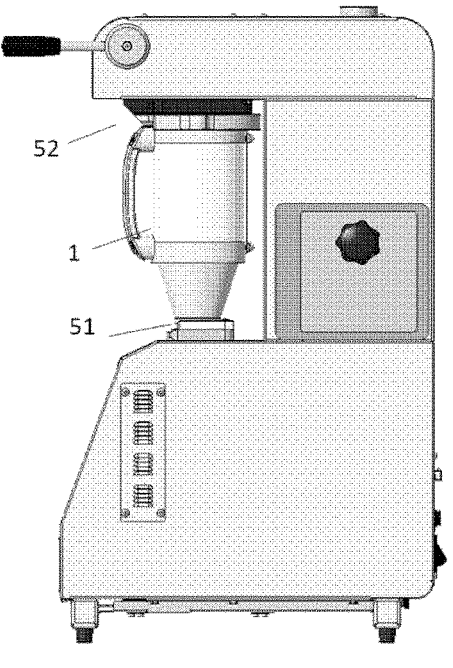
Figure 6A:
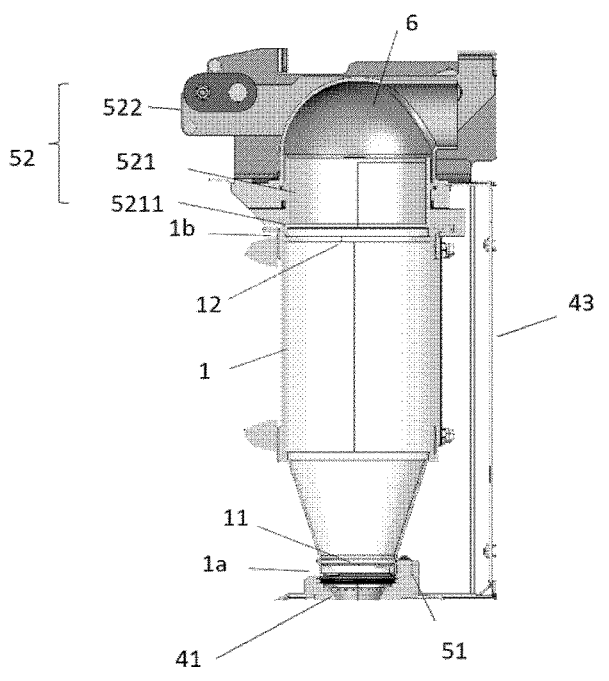
Figure 5B:
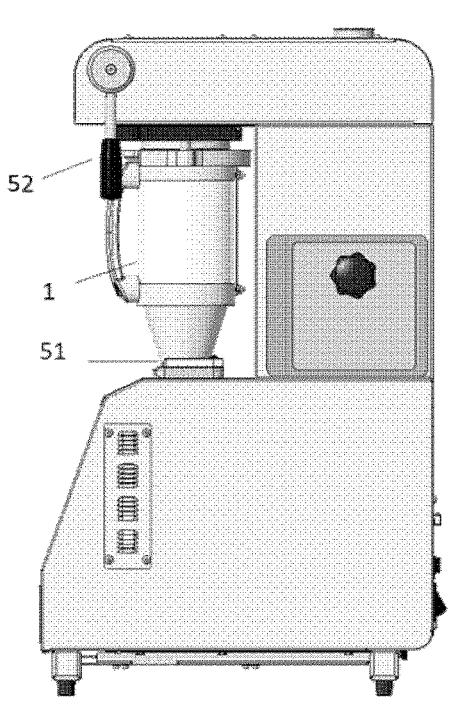
Figure 6B:
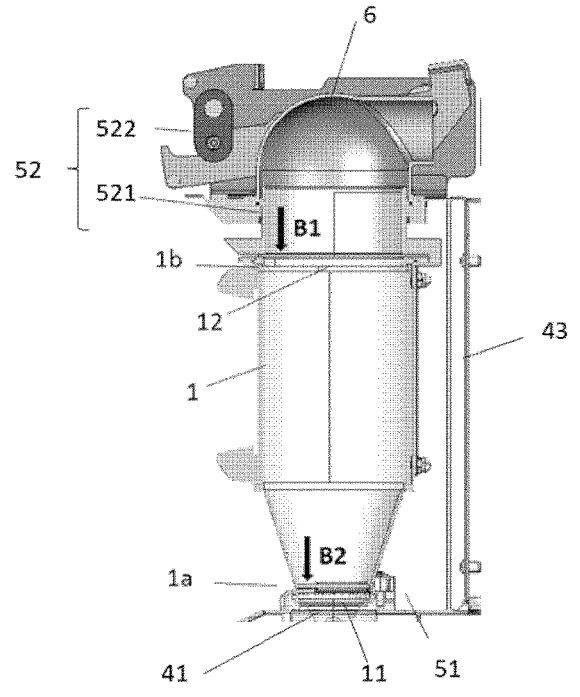
Figures 7A, 7B, 7C:
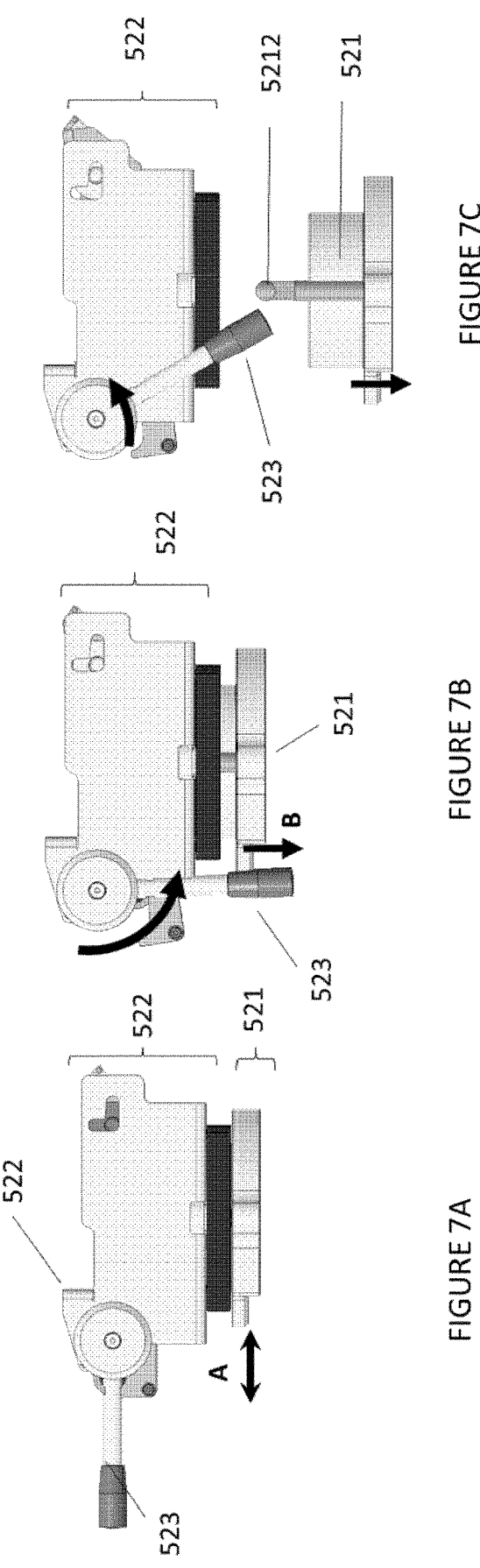
Figure 8C:
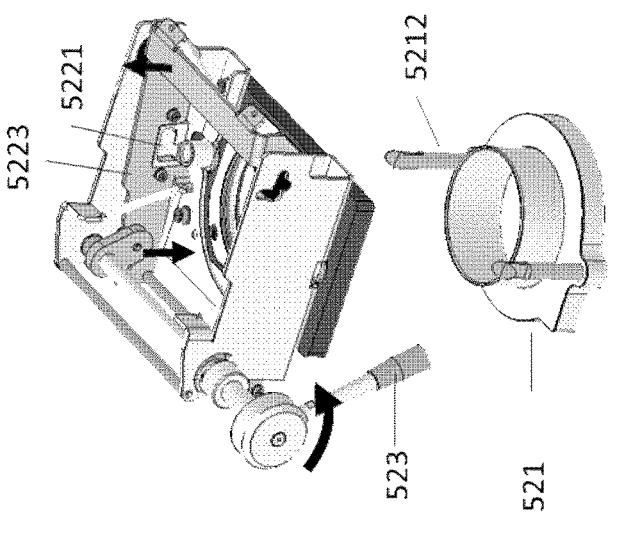
Figure 8B:
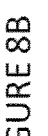
Figure 8A:
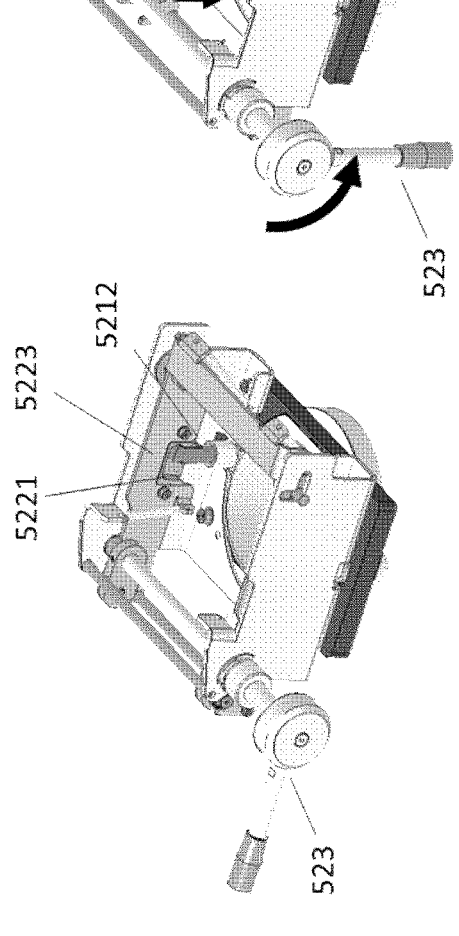

FIG. 3 is a perspective view of the roasting apparatus, the chamber being removed therefrom and FIG. 4 is a magnified view of FIG. 3 illustrating the bottom device of the chamber locking assembly, FIGS. 5A and 5B are side views of the roasting apparatus with the chamber 1 hold inside, FIGS. 6A and 6B are vertical cross section views of the left upper quarter of FIGS. 5A and 5B respectively, FIGS. 7A, 7B and 7C are side views of the top fastening device in each of the three positions, FIGS. 8A, 8B and 8C are perspective views corresponding to FIGS. 7A, 7B and 7C, FIGS. 9A, 9B and 9C are vertical cross section views corresponding to FIGS. 7A, 7B and 7C.

FIG. 2 is a side view of a roasting apparatus 10 according to the invention. The apparatus comprises a housing 4 in which an air driver 2 and an air heater 3 are positioned. The air driver 2 is a fan driving air upwardly to the heater 3 and then to an air outlet hole 41 inside the chamber as illustrated by dotted lines.

The heater can heat the flow of air to a temperature comprised between 100 and 300° C.

The roasting apparatus comprises a roasting chamber 1 designed to hold coffee beans and to create a fluid bed of air from the hot air flow introduced through its opened bottom 11. The bottom opening 11 comprises a grid to retain coffee beans (not illustrated). When the chamber is mounted to the housing, the bottom of the chamber is connected to the air outlet hole 41.

Usually, at least the top of the chamber presents a cylindrical shape, and preferably the top opening comprises a flange extending radially from the top edge.

The top opening 12 of the chamber is connected to a smoke and particles collector 6 configured to collect smoke and particles from the top opening 12 of the roasting chamber.

The chamber is locked in the apparatus by a chamber locking assembly 5 in a removable manner. This assembly 5 comprises:

a bottom device 51 for connecting the bottom opening 11 of the chamber to the hot air outlet hole 41 of the housing, and a top fastening device 52 for connecting the top opening 12 of the chamber to the smoke and particles collector 6.

The chamber 1 is removable from the housing 4 as illustrated in FIG. 3. The chamber 1 can be put aside the roasting apparatus 10 either for introduction or removal of coffee beans or for cleaning and maintenance.

FIG. 3 illustrates the bottom device 51 of the chamber locking assembly and FIG. 4 provides a magnified view of said bottom view. In this embodiment, the bottom device 51 is jaws able to open to receive the bottom 11 of the chamber and to clamp it once the bottom is correctly positioned above the air outlet 41. Each parts 511a, 511b of the jaws are able to move away from the and are spring loaded to move away from the edge of the air outlet 41, in particular when the bottom 11 of the roasting chamber is slid horizontally in the middle of the jaws as illustrated by the arrow A in FIG. 4. The front edge 5111 of each jaw is preferably designed to enable the opening of the jaws when the bottom of the chamber forces these edges along the direction A, as illustrated by the white arrows in FIG. 4.

Each of the jaws are spring loaded so that once the bottom of the chamber has moved away and passed the edges of the jaws and is positioned above the air outlet 41, then the jaws move back and hold tightly the bottom of the chamber.

The force exerted by the springs is such that it enables an easy removal of the chamber from the jaws by the operator when the roasting operation is finished.

Consequently, this bottom device 51 holds the chamber on its own. The operator can put the chamber inside the apparatus and let it here for a moment before finishing the fastening operation at the top.

In addition, the bottom device 51 is configured to immobilize the chamber in a vertical position inside the roasting apparatus. Consequently, when in a second step the top of the chamber is fastened as described below, there is no risk that the bottom of the chamber is hold or moves obliquely and that the connection between the bottom of the chamber and the air outlet of the housing is not tight.

During in the second step the top of the chamber is fastened, the whole chamber moves slightly vertically downwards and an air tight connection is established between the air outlet 41 and the bottom opening of the chamber.

FIGS. 5A and 5B are side views of the roasting apparatus with the chamber 1 hold inside the roasting apparatus 10 according to two different situations. FIGS. 6A and 6B are corresponding vertical cross sections of the chamber and the chamber locking assembly.

In FIGS. 5B and 6B, the top 12 of the chamber is locked by the top fastening device 52 of the chamber locking assembly. The operator cannot remove the chamber 1 from the apparatus and the chamber is ready for a roasting operation.

In FIGS. 5A and 6A, the top 12 of the chamber is not locked by the top fastening device 52 of the chamber locking assembly. The operator can remove the chamber 1 from the apparatus by simply pulling it out with the handle.

FIGS. 5B and 6B show the smoke and particles collector 6 which is connected to the top opening 12 of the chamber through a connecting conduit 521 extending from the top 1b of the chamber to the collector 6. The collector drives smoke and chaffs to trap for the chaffs (preferably a cyclone) and to a smoke filter preferably (not illustrated).

The connecting conduit 521 is movable and in particular translatable up and down between the two positions illustrated in FIGS. 6A and 6B.

In FIG. 6A, the connecting conduit 521 is positioned in its first upper position: it is positioned at a distance sufficiently far from the bottom device 51 of the chamber locking assembly to enable an operator to introduce the chamber inside the roasting apparatus by sliding the flange 14 at the top 1b of the chamber inside a guiding rail 5211 at the lower part of the connecting conduit 521 and simultaneously sliding the bottom 1a of the chamber inside the jaws 51. The movement is a simple essentially horizontal translation. No rotation with risk of misalignment of the chamber occurs.

In FIG. 6B, the connecting conduit 521 is positioned in its second intermediate position, after having been moved down according to a direct vertical translation without any rotation, and this connecting conduit 521 presses on the top 1b of the chamber (arrow B1), automatically pushing the chamber 1 downwards too (arrow B2). As a result, the bottom 1a of the chamber is pressed again the edge of the housing surrounding the air outlet 41 and a tight connection of the bottom 1 a of the chamber with the air outlet 41 is obtained. A gasket or seal is usually present in between these two parts to improve tightness.

FIGS. 7A and 7B are side views of the translatable connecting conduit 521 in the first upper position and second intermediate position as described in FIGS. 5A, 6A and FIGS. 5B, 6B respectively. FIG. 7C is a side view of the translatable connecting conduit 521 in the third lower position. In this position the connecting conduit 521 becomes completely detached from the fixed holding device 522. it can be hold by the operator who is able to clean it thoroughly outside the roasting apparatus, for example on a work table.

Simultaneously the fixed holding device 522 of the fixed chamber support becomes fully accessible. This is convenient for the operator and the operation is carried out more efficiently than in apparatus of the prior art.

The position of the translatable connecting conduit 521 is controlled by the manoeuvring device 523, here a lever of which movement creates a rocking motion of means 5223 holding the translatable connecting conduit 521 as illustrated in FIGS. 8A to 8C (and corresponding respectively to FIGS. 7A to 7C). The course of the rocking motion of this holding means 5223 extends between two ends, one end wherein the frame 5224 of the fixed holding device holds the translatable connecting conduit 521 (and corresponding to the first upper position of the translatable connecting conduit 521), another end wherein the frame 5224 of the fixed holding device releases the translatable connecting conduit 521 (and corresponding to the third position of the translatable connecting conduit 521). Between the two ends, the frame 5224 of the fixed holding device holds the translatable connecting conduit 521 in the intermediate position.

As illustrated in FIGS. 8A to 8C and corresponding FIGS. 9A to 9C, the holding means 5223 is provided with slots 5221 designed to engage with retaining pins 5212 of the translatable connecting conduit. The slots are designed to retain the pins and let them slide according to the rocking motion of the holding means 5223.

Springs 5222 are provided to compensate any small variation in the height of the removable chamber below the translatable connecting conduit. Actually, due to small differences during the manufacture of the chamber, up to 2 or 3 mm of difference can be measured between the heights of two chambers. The variation is compensated by the springs enabling the bottom edge of the translatable connecting conduit to reach the upper edge of the chamber whatever the exact height of the chamber.

Springs provide also a soft feedback to the operator during the movement of the top device of the chamber locking assembly.

LIST OF REFERENCES IN THE DRAWINGS roasting apparatus 10
roasting chamber 1
bottom 1a
top 1b
bottom opening 11
top opening 12
handle 13
flange 14
air driver 2
heater 3
housing 4
air outlet hole 41
vertical housing part 43
chamber locking assembly 5
bottom device 51
jaws 511a, 511b
edge 5111
top device 52
translatable connecting conduit 521
guiding rail 5211
retaining pin 5212 fixed holding device 522
slot 5221
springs 5222
holding means 5223
frame 5224
maneuvering device 523
smoke and particles collector 6

The invention claimed is:

1. An apparatus for roasting coffee beans comprising:
a housing,
a roasting chamber presenting a bottom opening and a top opening,
an air driver configured to drive air inside the roasting chamber through the bottom opening of said roasting chamber,
a heater positioned below the bottom opening of the roasting chamber, said heater being configured to heat the air driven inside the roasting chamber,
the air driver and the heater being positioned inside the housing and the housing comprising a hot air outlet hole designed to enable the passage of hot air from the housing inside the bottom opening of the roasting chamber,
a smoke and particles collector configured to collect smoke and particles from the top opening of the roasting chamber,
the roasting chamber being removably mounted to the housing, the bottom opening of the roasting chamber cooperating with the hot air outlet hole of the housing and the top opening of the roasting chamber cooperating with the smoke and particles collector when the roasting chamber is mounted to the housing,
a chamber locking assembly for locking the roasting chamber to the housing in a removable manner, wherein said chamber locking assembly comprises:

a bottom device configured for connecting the bottom opening of the roasting chamber to the hot air outlet hole of the housing, said bottom device being configured to receive a bottom of the roasting chamber and to hold the roasting chamber,
a top fastening device for connecting the top opening of the roasting chamber to the smoke and particles collector, said top fastening device comprising:
a translatable connecting conduit configured to connect the top opening of the roasting chamber to the smoke and particles collector, said translatable connecting conduit being translatable without rotating, and
a fixed holding device configured to hold the translatable connecting conduit in at least three positions:
one first upper position where the translatable connecting conduit is hold held by the fixed holding device and disconnected from a top of the roasting chamber,
one second intermediate position where the translatable connecting conduit is connected to the top of the roasting chamber, and
one third lower position where the translatable connecting conduit is detached from the fixed holding device.

2. The apparatus for roasting coffee beans according to claim 1, wherein the bottom device is configured to immobilize the roasting chamber in a vertical position.

3. The apparatus for roasting coffee beans according to claim 1, wherein the bottom device is jaws or a clamp.

4. The apparatus for roasting coffee beans according to claim 1, wherein:
the top of the roasting chamber comprises a flange, and
a bottom end of the translatable connecting conduit comprises a guiding rail designed to cooperate with said flange.

* * * * *